Patented Aug. 21, 1934

UNITED STATES PATENT OFFICE 1,970,644

1,970,644

PRINTING TEXTILE FIBERS

Hermann Berthold, Leverkusen, Germany, assignor to General Aniline Works, Inc., New York, N. Y., a corporation of Delaware No Drawing. Application January 29, 1931, Serial No. 512,193. In Germany February 4, 1930

20 Claims. (Cl. 8—6)

The present invention relates to new vat or sulfur dyestuff preparations suitable for printing purposes and to a process of printing textile fibers with these preparations.

In accordance with the invention amino anthraquinones or reduction products thereof as still contain oxygen in the ms-position or mixtures of these compounds are employed to influence favorably the capacity for printing of vat or sulfur dyestuffs, that is, to improve the strength of the printings obtainable and at the same time the speed of fixation.

As well $\alpha$-aminoanthraquinones as $\beta$-aminoanthraquinones and $\alpha.\alpha$-, $\alpha.\beta$-, and $\beta.\beta$-diaminoanthraquinones can be applied, the best results generally being obtained with aminoanthraquinones containing at least one amino group in the $\beta$-position. Likewise the reduction products of all these compounds, as far as they contain oxygen in the ms-position, are operable.

The further addition of anthraquinone or reduction products thereof containing oxygen in many cases enhances the efficacy of the first mentioned products. Likewise hydroxyanthraquinones or reduction products thereof containing oxygen in the ms-position may be applied simultaneously.

The aminoanthraquinones and likewise the anthraquinone or the hydroxyanthraquinones or the reduction products of these substances are preferably applied in a finely divided state for the purposes of the present process. For example, the substances in question may be finely ground or they may be dissolved in sulfuric acid and reprecipitated with water or they may be reduced, wholly or in part, if desired in the presence of glycerine or another suitable alcohol soluble in water, and thus be obtained in a paste which does not lead to deposition.

The incorporating of the aminoanthraquinones or their reduction products containing oxygen in the ms-position with the dyestuffs may be accomplished in a variety of ways. For example, the different constituents may be mixed in the dry state or in form of aqueous pastes, or the aminoanthraquinones, etc., may be added to the printing colors at any stage of their manufacture. The best results generally are obtained when adding the aminoanthraquinones to aqueous pastes of the dyestuffs containing glycerine or another suitable water soluble alcohol, such as ethyleneglycol, di-ethyleneglycol, thiodiglycol, thiodiglycerol and the like. The pastes thus obtainable are very stable, do not deposit or dry up, do not form crusts and can be applied for printing purposes even after prolonged storing. In some cases it will be of advantage to work in the following manner:—The dyestuff is suspended in water, glycerine or another water soluble alcohol as mentioned above is added and the dyestuff reduced in this suspension by means of a reducing agent customarily employed in vat dyeing, and in the presence of an alkali, such as caustic soda lye, caustic potash lye, or, preferably, in the presence of a weaker alkali, such as ammonia, sodium carbonate, potassium carbonate or the like. As reducing agents especially alkali metal hydrosulfites, but likewise titanium trichloride, etc., will be operable. An aminoanthraquinone or a reduction product thereof containing oxygen in the ms-position is added to the preparations above mentioned at any desired stage of their manufacture. The dyestuff pastes thus obtainable, containing the dyestuff in a reduced form (in the case of applying a rather weak alkali, such as ammonia, soda or potash probably in the form of the free leuco acid), likewise do not deposit, do not congeal, do not form crusts, and possess for printing purposes similar advantages as the preparations mentioned above.

Besides, the aminoanthraquinones and/or their reduction products above specified, anthraquinone and/or hydroxyanthraquinones or reduction products of these compounds containing oxygen in the ms-position and/or hydrotropically acting agents may be added. Under the term "hydrotropically acting agents" I understand compounds promoting the solubility of water insoluble or difficultly soluble substances in water (compare Neuberg, Biochemische Zeitschrift, vol. 76 (1916) page 107 ff; Tamba, Biochemische Zeitschrift, vol. 145, (1924) page 415 ff; Neuberg, Sitzungsber. der kgl. preuss. Ak. der Wiss. (1916). Suitable hydrotropically acting agents are for example: Urea, substituted ureas, thiourea, hexamethylenetetramine, the potassium salt of methylether sulfonic acid, the ammonium or alkali metal salts of the following acids: phenylacetic acid, benzoic acid, orthotoluene carboxylic acid, salicylic acid, 2-naphthol-3-carboxylic acid, the benzene sulfinic acids, such as 1.4-toluene sulfinic acid, the benzene sulfonic acids, para-toluene sulfonic acid, naphthalene sulfonic acids, e. g. naphthalene-1- or 2-sulfonic acid, aniline sulfonic acids, and substitution products thereof, such as for example, dimethylmetanilic- or diethylmetanilic acid, dimethyl-2-toluidine-4-sulfonic acid, dimethyl-4-aminobenzoic acid, alkali metal salts of hydroaromatic carboxylic and sulfonic acids, as for example, the cyclohexane carboxylic acid, tetrahydronaphthalene-$\beta$-sulfonic acid and the like.

It may be mentioned that the hydrotropic agent to be used in a particular case will depend on the nature of the dyestuff to be printed as well as on the printing method applied; furthermore, that the preparations above described are of especially high value in printing of cotton.

For printing purposes the preparations described above are worked up to printing colors in any desired manner. For example, the dry preparations may be made up to aqueous pastes suitably in the presence of glycerine, ethylene glycol or another suitable water soluble alcohol, a thickening of any desired composition is added, furthermore caustic soda lye and sodium hydrosulfite, and the mixture heated to 60° C. until the dyestuff has dissolved in the form of its leuco derivative. After cooling sodium formaldehydesulfoxylate and potassium carbonate are stirred into the mixture. Cotton or another suitable textile product is printed with this printing color, the printings are steamed, for example, in a Mather-Platt apparatus and developed by a treatment with suitable oxidizing agents, such as oxygen (air), potassium bichromate and acetic acid or the like. Finally the printings are soaped while boiling.

Another method of printing with my preparations will be as follows:—

The powdery preparations are made up to an aqueous paste, a thickening, glycerine, potassium carbonate and sodium formaldehydesulfoxylate are added and textile products are printed with these printing colors containing the dyestuff in the unreduced state. The printings are steamed, whereby reduction of the dyestuff occurs, and further treated as described above. Instead of the powdery preparations the aqueous pastes thereof, which may contain glycerine, ethylene glycol, thiodiglycol etc. may be applied, whereby in case that the pastes contain glycerine etc. a further addition of the latter when preparing the printing colors will be unnecessary in many cases, but necessary in other cases, mainly depending on the type of dyestuff applied. According to this process likewise my dyestuff preparations, obtained by reducing the dyestuffs in the presence of water, glycerine etc. and an alkali, preferably one which is weaker than caustic alkali lyes, such as ammonia, sodium carbonate, potassium carbonate etc. may be worked up to printing colors and applied for printing purposes. It may be mentioned that also in this case the addition of a suitable reducing agent, such as sodium formaldehydesulfoxylate and of an alkali and in most cases of glycerine, thiodiglycol or the like, to the printing color will be necessary or at least advantageous in order to obtain the best results. When using in the claims the term "dyestuff preparations suitable for printing purposes" the same is intended to include not only the dry dyestuff preparations of vat or sulfur dyestuffs as defined before, but likewise the corresponding printing colors or aqueous pastes of the dyestuffs with or without the addition of glycerine or other water soluble alcohols, alkalies, reducing agents etc.

The following examples illustrate the invention without limiting it thereto:—

*Example 1.*—A printing paste is prepared from 20 parts by weight of 6.6'-dichloro-4.4'-dimethyl-bis-thionaphtheneindigo, 4 parts by weight of glycerine, 12 parts by weight of 2-aminoanthraquinone (10% aqueous paste) and 70 parts by weight of a thickening of the following composition:—

60 parts by weight of wheat starch
  150 parts by weight of water
   60 parts by weight of British gum powder
  260 parts by weight of industrial gum 1:1
  170 parts by weight of tragacanth 65:1000
  150 parts by weight of potassium carbonate and
  150 parts by weight of sodium formaldehydesulfoxylate 1000 parts by weight and printing of cotton with this printing paste is effected in the customary manner. The printed goods are dried and steamed for 5 minutes with moist steam. The dyestuff is developed by means of potassium dichromate-acetic acid (2 parts by weight of potassium dichromate and 5 parts by weight of 30% acetic acid in 1 litre of water) and soaped at the boil.

*Example 2.*—When the dyestuff of Example 1 is replaced by 3.4.8.9-dibenzopyrenequinone (Ber. 55, 118) or by pyranthrone or by 5.5'-dibenzoylamino - 1.1' - dianthraquinonylamine - carbazole and 2.6- or 2.7-diamino-anthraquinone is used instead of the 2-aminoanthraquinone specified in Example 1 deeper printings and more satisfactory fixation result than without the addition of diaminoanthraquinones.

*Example 3.*—Similar satisfactory results are obtained by the use of printing pastes in accordance with Example 1 with other combinations, such as for example, 3.4.8.9-dibenzopyrenequinone and 1.5-diaminoanthraquinone or 1-aminoanthraquinone or 1.8-diaminoanthraquinone.

*Example 4A.*—

200 parts by weight of a 20% aqueous paste of 5.5' - dibenzoylamino - 1.1'-dianthraquinonylamine-carbazole
40 parts by weight of 2.6-diaminoanthraquinone in the form of a 10% paste (obtained with the addition of glycerine)
80 parts by weight of 88% glycerine and
40 parts by weight of urea or the sodium salt of dimethylmetanilic acid are evaporated with stirring until the paste contains 20% of dyestuff. Instead of the dyestuff mentioned, dimethoxy-dibenzanthrone (Caledon jade green) or 4.7.4'.7'-tetramethyl-5.5'-dichlorobisthionaphthene-indigo or 6.6'-diethoxy-2.2'-bisthionaphthene-indigo may be used.

*Example 4B.*—A printing paste is produced without heating from 20 parts by weight of the dyestuff preparation of Example 4A and 80 parts by weight of a thickening containing in 1000 parts:—

170 parts by weight of tragacanth 65:1000
  160 parts by weight of industrial gum 1:1
   60 parts by weight of wheat starch
  150 parts by weight of water
   60 parts by weight of British gum powder
  100 parts by weight of glycerine
  150 parts by weight of potassium carbonate and
  150 parts by weight of sodium formaldehydesulfoxylate 1000 parts by weight which is left to stand over night. Printings obtainable with this printing paste on cotton in accordance with Example 1 show considerably increased fixation as compared with the printings obtained with the customary commercial aqueous dyestuff paste without the addition of anthraquinone derivatives and hydrotropic agents.

For slop-padding the new preparations likewise display advantages over the aqueous pastes without the said additions.

*Example 5.*—A mixture of:

1586 parts by weight of an aqueous paste containing 400 parts by weight of tetrabromoindigo
448 parts by weight of an aqueous paste of 2-aminoanthraquinone of 4.5% strength
800 parts by weight of crude glycerine (88%)

2000 parts by weight of water is treated with
180 parts by weight of sodium hydrosulfite and
800 parts by weight of aqueous ammonia
(25%)
until the dyestuff is reduced.

The mixture is then evaporated to a dyestuff content of 17.5% with or without the addition of 300 parts by weight of the sodium salt of 1.4-dimethylanilinesulfonic acid or of hexamethylenetetramine.

A printing paste prepared from this paste according to Example 4B shows considerably increased fixation and yields stronger printings compared with the same paste without the addition of β-aminoanthraquinone.

Instead of the dyestuffs enumerated in the examples sulfur dyestuffs or other vat dyestuffs, especially indigoid or thioindigoid dyestuffs and vat dyestuffs containing the anthraquinone ring system, such as suitable substituted anthraquinones, vat dyestuffs of the dianthraquinonylamine-, dianthraquinonylaminecarbazole-, indanthrone-, flavanthrone-, anthanthrone-, perylene-, pyranthrone, dibenzanthrone, isodibenzanthrone-series may be applied.

I claim:—

1. Vat and sulfur dyestuff preparations suitable for printing textile fibers comprising a finely divided compound of the group consisting of aminoanthraquinones and such reduction products thereof as contain oxygen in the meso-position.

2. Vat and sulfur dyestuff preparations suitable for printing textile fibers comprising a finely divided compound of the group consisting of aminoanthraquinones containing at least one amino group in the beta-position and such reduction products thereof as contain oxygen in the meso-position.

3. Vat and sulfur dyestuff preparations suitable for printing textile fibers comprising a finely divided compound of the group consisting of 2-aminoanthraquinone, 2.6- and 2.7-diaminoanthraquinones and such reduction products of these compounds as contain oxygen in the meso-position.

4. Vat and sulfur dyestuff preparations suitable for printing textile fibers comprising a hydrotropic agent and a finely divided compound of the group consisting of aminoanthraquinones and such reduction products thereof as contain oxygen in the meso-position.

5. Vat and sulfur dyestuff preparations suitable for printing textile fibers comprising a hydrotropic agent, and a finely divided compound of the group consisting of aminoanthraquinones containing at least one amino group in the beta-position and such reduction products thereof as contain oxygen in the meso-position.

6. Vat and sulfur dyestuff preparations suitable for printing textile fibers comprising a hydrotropic agent and a finely divided compound of the group consisting of 2-aminoanthraquinone, 2.6- and 2.7-diaminoanthraquinones and such reduction products of these compounds as contain oxygen in the meso-position.

7. Vat and sulfur dyestuff preparations suitable for printing textile fibers comprising an alcohol of the group consisting of glycerine, ethyleneglycol, diethyleneglycol, thiodiglycol and thiodiglycerol, and a finely divided compound of the group consisting of aminoanthraquinones containing at least one amino group in the beta-position and such reduction products thereof as contain oxygen in the meso-position.

8. Vat and sulfur dyestuff preparations suitable for printing textile fibers comprising an alcohol of the group consisting of glycerine, ethyleneglycol, diethyleneglycol, thiodiglycol and thiodiglycerol, and a finely divided compound of the group consisting of 2-aminoanthraquinone, 2.6- and 2.7-diaminoanthraquinones and such reduction products of these compounds as still contain oxygen in the meso-position.

9. Vat and sulfur dyestuff preparations suitable for printing textile fibers comprising an alcohol of the group consisting of glycerine, ethyleneglycol, diethyleneglycol, thiodiglycol and thiodiglycerol, a hydrotropic agent and a finely divided compound of the group consisting of aminoanthraquinones containing at least one amino group in the beta-position and such reduction products thereof as contain oxygen in the meso-position.

10. Vat and sulfur dyestuff preparations suitable for printing textile fibers comprising an alcohol of the group consisting of glycerine, ethyleneglycol, diethyleneglycol, thiodiglycol and thiodiglycerol, a hydrotropic agent, and a finely divided compound of the group consisting of 2-aminoanthraquinone, 2.6- and 2.7-diaminoanthraquinones and such reduction products of these compounds as contain oxygen in the meso-position.

11. The process which comprises printing textile fibers with a textile printing color obtained from a dyestuff of the group consisting of vat and sulfur dyestuffs, said color comprising a finely divided compound of the group consisting of aminoanthraquinones and such reduction products thereof as contain oxygen in the meso-position.

12. The process which comprises printing textile fibers with a textile printing color obtained from a dyestuff of the group consisting of vat and sulfur dyestuffs, said color comprising a finely divided compound of the group consisting of aminoanthraquinones, containing at least one amino group in the beta-position and such reduction products thereof as contain oxygen in the meso-position.

13. The process which comprises printing textile fibers with a textile printing color obtained from a dyestuff of the group consisting of vat and sulfur dyestuffs, said color comprising a finely divided compound of the group consisting of 2-aminoanthraquinone, 2.6- and 2.7-diaminoanthraquinones and such reduction products of these compounds as contain oxygen in the meso-position.

14. The process which comprises printing textile fibers with a textile printing color obtained from a dyestuff of the group consisting of vat and sulfur dyestuffs, said color comprising a hydrotropic agent and a finely divided compound of the group consisting of aminoanthraquinones and such reduction products thereof as contain oxygen in the meso-position.

15. The process which comprises printing textile fibers with a textile printing color obtained from a dyestuff of the group consisting of vat and sulfur dyestuffs, said color comprising a hydrotropic agent and a finely divided compound of the group consisting of aminoanthraquinones containing at least one amino group in the beta-position and such reduction products thereof as contain oxygen in the meso-position.

16. The process which comprises printing textile fibers with a textile printing color obtained from a dyestuff of the group consisting of vat and sulfur dyestuffs, said color comprising a hydrotropic agent and a finely divided compound of the group consisting of 2-amino-anthraquinone, 2.6- and 2.7-diaminoanthraquinones and such reduction products of these compounds as contain oxygen in the meso-position.

17. The process which comprises printing textile fibers with a textile printing color obtained from a dyestuff of the group consisting of vat and sulfur dyestuffs, said color comprising an alcohol of the group consisting of glycerine, ethyleneglycol, diethyleneglycol, thiodiglycol and thiodiglycerol, and a finely divided compound of the group consisting of aminoanthraquinones containing at least one amino group in the beta-position and such reduction products thereof as contain oxygen in the meso-position.

18. The process which comprises printing textile fibers with a textile printing color obtained from a dyestuff of the group consisting of vat and sulfur dyestuffs, said color comprising an alcohol of the group consisting of glycerine, ethyleneglycol, diethyleneglycol, thiodiglycol and thiodiglycerol, and a finely divided compound of the group consisting of 2-aminoanthraquinone, 2.6- and 2.7-diaminoanthraquinones and such reduction products of these compounds as contain oxygen in the meso-position.

19. The process which comprises printing textile fibers with a textile printing color obtained from a dyestuff of the group consisting of vat and sulfur dyestuffs, said color comprising a hydrotropic agent, an alcohol of the group consisting of glycerine, ethyleneglycol, diethyleneglycol, thiodiglycol, and thiodiglycerol, and a finely divided compound of the group consisting of aminoanthraquinones, containing at least one amino group in the beta-position and such reduction products thereof as contain oxygen in the meso-position.

20. The process which comprises printing textile fibers with a textile printing color obtained from a dyestuff of the group consisting of vat and sulfur dyestuffs, said color comprising a hydrotropic agent, an alcohol of the group consisting of glycerine, ethyleneglycol, diethyleneglycol, thiodiglycol and thiodiglycerol, and a finely divided compound of the group consisting of 2-aminoanthraquinone, 2.6- and 2.7-diaminoanthraquinones and such reduction products of these compounds as contain oxygen in the meso-position.

HERMANN BERTHOLD.